Feb. 11, 1930. G. C. DEVITT 1,746,243
SCALE
Filed Sept. 7, 1928 2 Sheets-Sheet 1

Inventor
George C. Devitt
By
Popp & Towers
Attorneys

Feb. 11, 1930.                G. C. DEVITT                1,746,243
                                 SCALE
                           Filed Sept. 7, 1928         2 Sheets-Sheet 2
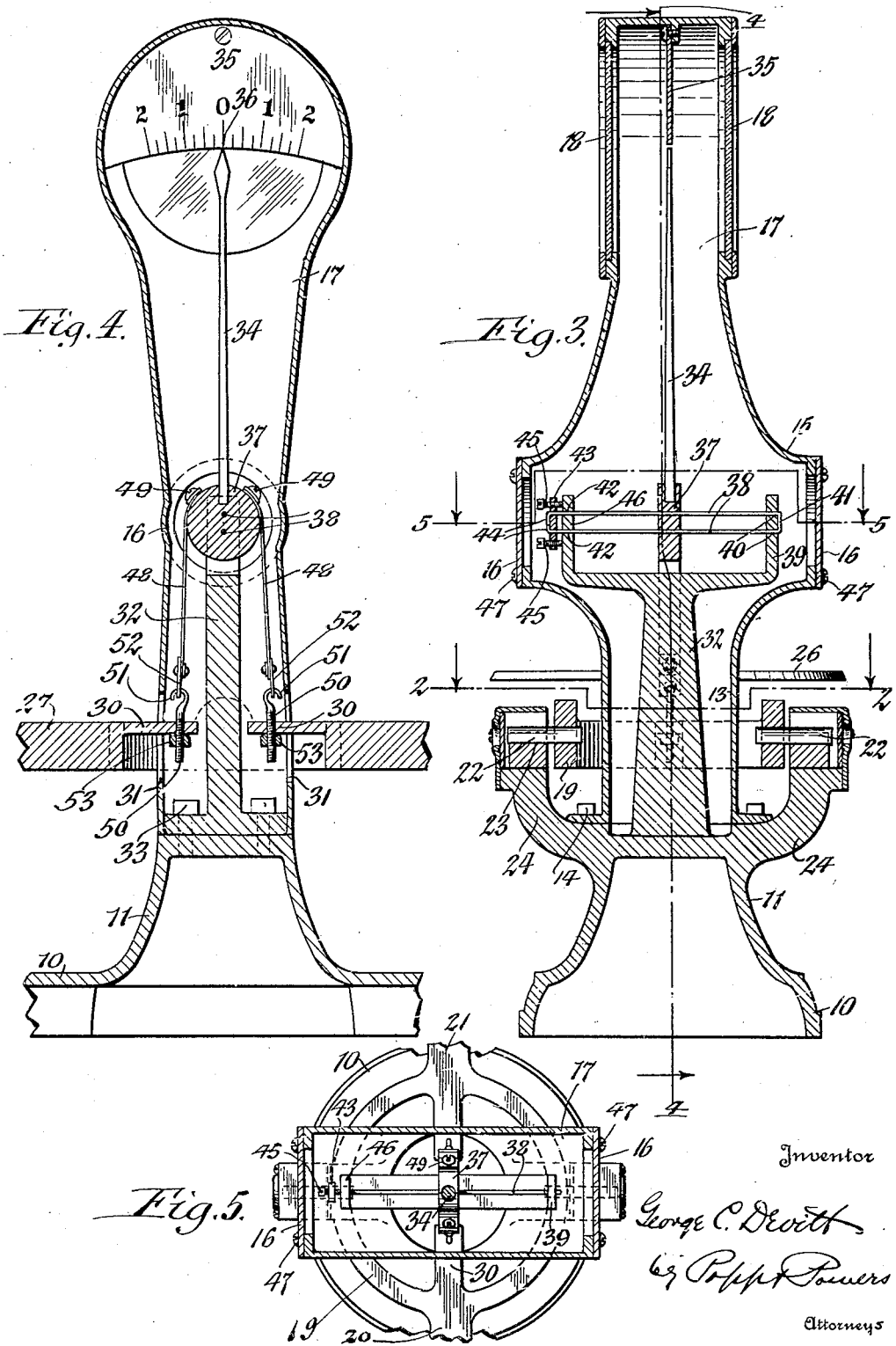

Patented Feb. 11, 1930

1,746,243

UNITED STATES PATENT OFFICE

GEORGE C. DEVITT, OF BUFFALO, NEW YORK, ASSIGNOR TO BUFFALO SCALE COMPANY, OF BUFFALO, NEW YORK, A CORPORATION OF NEW YORK

SCALE

Application filed September 7, 1928. Serial No. 304,487.

This invention relates to that type of scales which are more particularly adapted for accurately determining the small amounts which the load or commodity being weighed is over or under a predetermined value.

It is the object of this invention to provide a scale of this character in which the over and under weight indicating mechanism is of a construction which is simple, sensitive, not liable to get out of order and capable of being easily adjusted in order to secure the desired tension.

In the accompanying drawings:

Fig. 3 is a vertical transverse section taken on line 3—3, Fig. 1.

Fig. 4 is a fragmentary vertical longitudinal section, taken on line 4—4, Fig. 3.

Fig. 5 is a horizontal section, taken on line 5—5, Fig. 3.

In the following description similar characters of reference indicate like parts in the several figures of the drawings.

Figure 1:
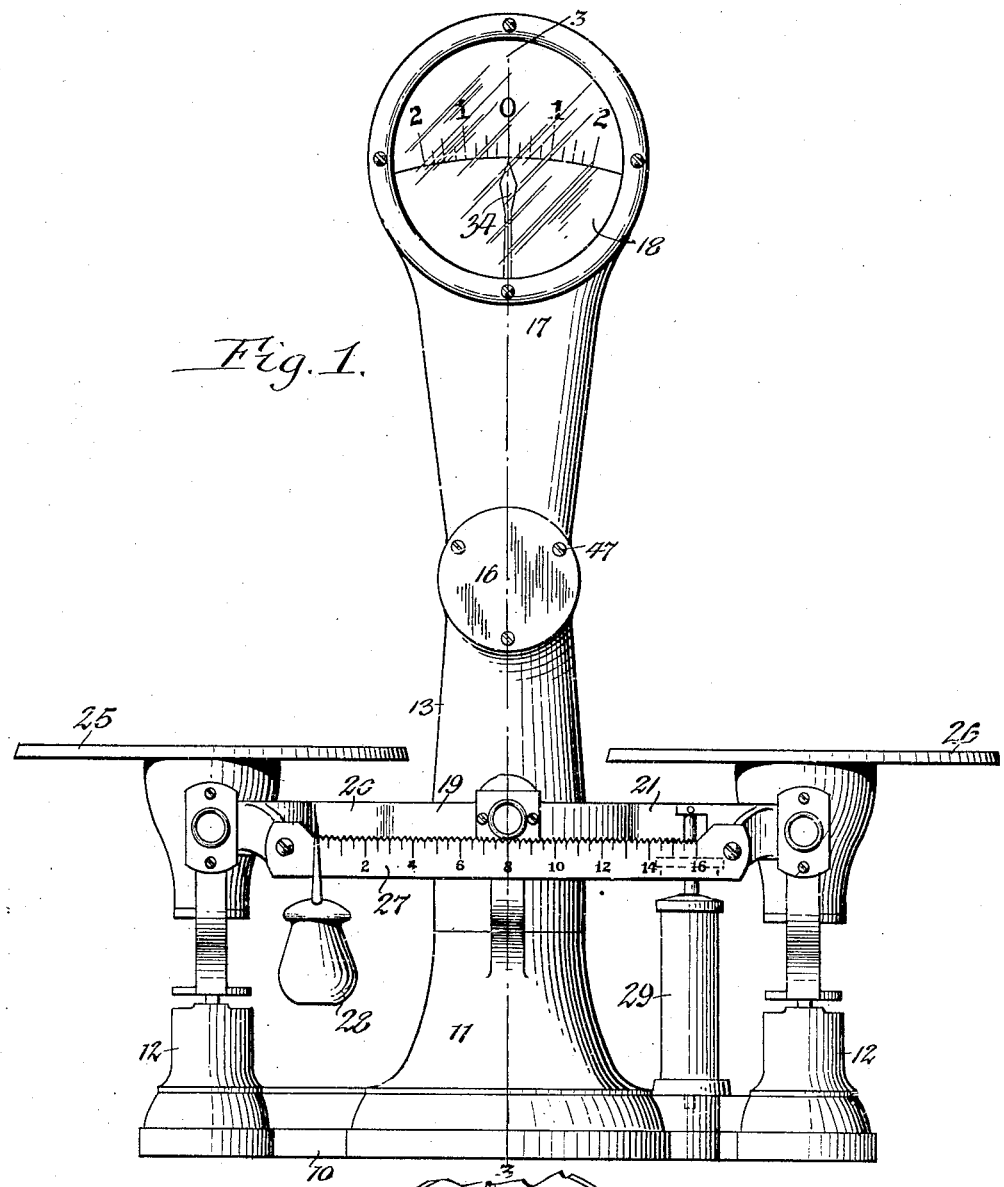
Fig. 1 is a front elevation of a scale embodying a suitable form of my invention.

The numeral 10 represents the base of a scale which may be of any suitable construction in order to properly support the various working parts, but as shown in the drawings the same is provided centrally with an upwardly projecting pedestal 11 and at its opposite ends with guide tubes 12.

Mounted on the upper end of the pedestal and projecting upwardly therefrom is a hollow standard which preferably has a contracted lower part 13 secured to the upper end of the pedestal by means of screws 14, an enlarged central part 15 having removable plates 16 on its front and rear sides, and a contracted upper part 17 provided with transparent panes or windows 18 on its front and rear sides.

Figure 2:
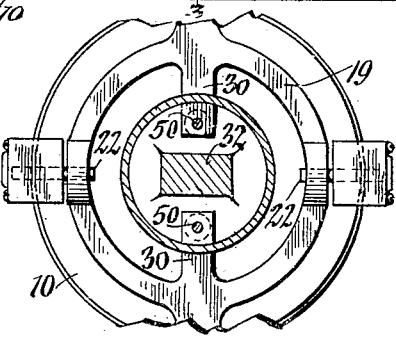
Fig. 2 is a horizontal section taken on line 2—2, Fig. 3.

Arranged above the base and pedestal is a vertically swinging scale lever which has a ring-shaped central part or hub 19 surrounding the lower part of the standard and two longitudinal arms 20, 21 projecting laterally from opposite sides of the ring 19. This scale lever can be pivotally mounted on the base in any suitable manner, but preferably by means of knife edges or pivots 22 arranged on diametrically opposite sides of the ring 19 and engaging with bearings 23 which are carried by brackets 24 projecting upwardly from the pedestal 11, as best shown in Figs. 2 and 3.

Upon opposite end of the scale lever are mounted, respectively, the counterbalance weight pan or platter 25 and the load receiving pan or platter 26, the former being adapted to receive interchangeable counterweights and the latter being adapted to receive the article or commodity which is to be weighed.

Mounted lengthwise on the front side of the scale lever is a graduated scale beam 27 which extends from one side of the axis of this lever to the other and upon which a scale poise 28 is adapted to be moved lengthwise during the operation of weighing an article in the usual and well-known manner. The vertical rocking motion of the scale lever and associated parts is preferably dampened by means which preferably consists of a dashpot 29 interposed between the load arm 21 of the scale lever and the adjacent part of the base, as shown in Fig. 1.

The parts thus far described represent the main elements of scales now in common use as an example of one form which is suitable for use in connection with my improvements. These improvements, which permit of more accurately and readily determining whether the object being weighed is slightly over or under weight, may be varied so far as the details of the same are concerned but in the preferred form the same, as shown in the drawings, are constructed as follows:

The numeral 30 represents two coupling lugs projecting inwardly from the scale lever ring 19 through openings 31 in the adjacent lower part of the hollow standard so that these lugs terminate within the latter.

Arranged centrally within the lower part of the standard and between the opposing inner ends of the coupling lugs 30 is an upright post or column 32 which is mounted at its lower end on the top of the pedestal 11 and preferably secured thereto by means of screws 33. Upon the upper end of this post is mounted a pointer 34 which is arranged in the upper part of the standard and adapted to sweep or traverse with its upper end a dial 35 which is provided with suitable graduations extending in opposite directions from a central or zero point 36 thereon. Although this dial may be variously formed it preferably consists of a flat plate which is secured to the top of the hollow standard and provided on its opposite sides with suitable graduations and has its lower edge arranged close to the path of the upper end of the pointer 34, the position of which can be readily observed by looking through either one of the windows 18 arranged on opposite sides of the dial and upper end of the pointer.

The lower end of the pointer is mounted on the post or column 32 so as to be capable of a rocking motion which is derived from the scale lever and transmitted thereto by an intermediate transmitting mechanism, and this rocking motion of the pointer is resisted by a resilient centering device. The means for transmitting motion from the scale lever to the pointer and the resilient centering means which resist deflection of the pointer in both directions from its central or neutral position are the subject of the present invention and in their preferred form these means, as shown in the drawings, are preferably constructed as follows:

The numeral 37 represents the circular or cylindrical hub or drum secured to the lower or inner end of the pointer and arranged above the upper end of the post 32 and forming part of the means whereby the pointer is pivotally supported so that the same can rock about an axis which is horizontal and transverse relative to the length of the scale, the axis of this pointer being preferably parallel with and above the axis of the scale lever. The means whereby this pointer is pivotally mounted, so as to be capable of a rocking motion, are so organized that they also serve as a torsional spring resistance which tends constantly to hold the pointer in a central or zero position but permits of deflecting this pointer either in one direction or the other from this zero position and when the pointer is free will operate to automatically return the pointer to this position after being deflected therefrom. These torsion supporting means for the pointer preferably comprise two parallel spring wires 38 which are arranged horizontally and transversely above the post 32 and pass through corresponding spaced apart openings in the hub 37 of the pointer on opposite sides of the theoretical axis of the same.

The one pair of corresponding ends of these spring resistance and supporting wires are secured to a supporting lug 39 projecting upwardly from one side of the post 32 within the central enlargement 15 of the standard, this connection being preferably effected by passing the respective ends of the wires 38 through openings 40 in this lug 39 and engaging the outer side of this lug by the cross piece 41 which integrally connects these ends of these wires.

The opposite ends of the wires 38 are connected with the upper end of the post 32 by means which also permit of tightening and increasing the tension on these wires so that they will properly support the pointer and also effectively hold the pointer yieldingly in its central or zero position. For this purpose the opposite or rear ends of the wires 38 are passed through corresponding parallel openings 42 in an upwardly projecting lug 46 of the post 32 arranged within the rear part of the enlargement 15 of the standard and also through corresponding openings in a tightening block or plate 43 and then bent with their extremities 44 against the outer side of this tension or tightening block or plate, as best shown in Fig. 3. This tightening plate may be moved outwardly for the purpose of producing a longitudinal pull on the wires 38 and thereby adjusting the tension or torsion resistance thereof, this being preferably accomplished by means of adjusting screws 45 interposed between the plate 43 and the adjacent supporting lug 46. Each of these screws preferably engages with a threaded opening in one end of the adjusting plate 43 and bears against the outer side of the respective supporting lug 46.

Upon turning the screws 45 the proper tension may be placed upon the wires 38 so that the same will offer the proper torsional resistance against the deflection of the pointer from its neutral position either in one direction or the other and also return the same to this position after deflection and also serve as a pivotal support for the pointer which permits the same to rock about a horizontal, transverse axis.

This torsional spring mounting for the pointer is arranged within the enlarged central part 15 of the standard where the same is readily accessible for adjustment when required by removing one or both of the plates 16 on opposite sides of this part of the standard for which purpose these plates are detachably secured in place by means of screws 47.

Motion may be transmitted from the scale lever 27 to the pointer for rocking the latter in accordance with the value or weight of the material placed upon the load pan, tray or platter 26 as opposed to the counterpoise 28 or the interchangeable counterbalancing scale weights which may be placed upon the weight pan or platter 26. The preferred means for accomplishing this purpose consist of two flexible metal bands or strips 48 arranged upright on opposite sides of the axes of the scale lever and the hub of the pointer and secured at their upper ends by means of screws 49 or otherwise to the periphery of this pointer hub on opposite sides of the axis thereof, as best shown in Figs. 4 and 5, while the lower ends of these straps are adjustably connected with the scale lever on opposite sides of the axis of the same. Although this adjustable connection between each of the shifting members or straps 48 and the scale lever may be varied the same, as shown in Fig. 4 preferably consists of a screw 50 passing through the coupling lug 30 of the scale lever on the respective side of this axis and provided at its upper end with a hook 51 passing through an eye 52 at the lower end of the respective metal strap 48 and an adjusting screw nut 53 arranged on the threaded lower end of this screw and bearing against the under side of said lug 30. By means of these adjusting screws the relative position of the scale lever and the pointer may be so adjusted that when the scale lever is in its central, neutral or balanced position the pointer will also be in its central or zero position with reference to the dial 35 which it traverses.

Upon balancing the counterpoise and the load to be weighed on the scale lever the movement of the latter will be transmitted to the pointer 34 and if the scale lever is slightly out of balance this will be indicated by the pointer being moved a corresponding extent toward one side or the other from the central or zero position and thereby enable the exact weight of the article to be determined so that the customer will receive full value for the money spent for any particular commodity.

As the scale lever moves slightly out of balance in one direction or the other the straps 48 will turn the pointer upon its axis in the same measure and during such turning or rocking movement of the pointer a torsional stress will be placed upon the spring wires 38 which resists such movement and therefore operates to return the pointer to its central position on either side when the scale lever assumes an exact balanced position.

By thus utilizing the spring resistance or restoring means of the pointer for the additional purpose of a pivotal support whereby the pointer is permitted to rock upon its axis the construction as a whole is materially simplified and also rendered much more accurate inasmuch as frictional resistance in the pivotal mounting of the pointer is wholly eliminated, thereby rendering the present scale more sensitive or delicate than scales heretofore known in which friction pivots have been employed in mounting the over and under weight pointers or indicators of the same.

I claim as my invention:

1. A scale comprising a base, a lever pivotally mounted on said base, a dial, a rocking pointer traversing said dial, a pair of transverse torsion wires upon which said pointer is mounted, and means for transmitting motion from said lever to said pointer.

2. A scale comprising a base, a lever pivotally mounted on said base, a dial, a rocking pointer traversing said dial, a pair of parallel transverse torsion wires upon the central parts of which the pointer is mounted, means for supporting opposite ends of said wires, and means for transmitting motion from said lever to said pointer.

3. A scale comprising a base, a lever pivotally mounted on said base, a dial, a rocking pointer traversing said dial, a pair of transverse torsion wires for supporting said pointer, means for tensioning said wires, and means for transmitting motion from said lever to said pointer.

4. A scale comprising a base, a lever pivotally mounted on said base, a post rising from the base, and provided at its upper end with spaced supporting lugs, a pair of transverse torsion wires fixed at one of their corresponding ends on one of said lugs, an adjusting block attached to the opposite ends of said wires, adjusting screws interposed between said adjusting block and the other one of said supporting lugs, a hub mounted on the central parts of said wires, a pointer arranged on said hub, a dial traversed by said pointer, and means for transmitting motion from said lever to said pointer.

In testimony whereof I hereby affix my signature.

GEORGE C. DEVITT.